United States Patent
Horisaki et al.

(10) Patent No.: US 8,406,249 B2
(45) Date of Patent: Mar. 26, 2013

(54) COMMUNICATION DEVICE COMPRISING A CARRIER SENSE FUNCTION AND COMMUNICATION METHOD

(75) Inventors: Koji Horisaki, Yokohama (JP); Masahiro Sekiya, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/325,434

(22) Filed: Dec. 14, 2011

(65) Prior Publication Data
US 2012/0082056 A1  Apr. 5, 2012

Related U.S. Application Data

(62) Division of application No. 12/508,099, filed on Jul. 23, 2009, now Pat. No. 8,107,490.

(30) Foreign Application Priority Data

Jul. 24, 2008 (JP) ................................. 2008-191020

(51) Int. Cl.
*H04L 12/413* (2006.01)
(52) U.S. Cl. ........................................ 370/447; 370/454
(58) Field of Classification Search .................. 370/445, 370/447–448, 454, 458–459
See application file for complete search history.

(56) References Cited

U.S. PATENT DOCUMENTS

| | | | |
|---|---|---|---|
| 6,721,331 B1 | 4/2004 | Agrawal et al. | |
| 7,197,335 B2 | 3/2007 | Lau | |
| 7,221,681 B2 | 5/2007 | Choi et al. | |
| 7,245,654 B2 | 7/2007 | Chang et al. | |
| 7,305,237 B2 | 12/2007 | Stephens | |
| 7,339,892 B1 | 3/2008 | Engwer et al. | |
| 7,443,934 B2 | 10/2008 | Nishimura et al. | |
| 7,502,365 B2 | 3/2009 | Yamagata | |
| 7,660,327 B2 * | 2/2010 | Katar et al. | 370/461 |
| 8,315,645 B2 * | 11/2012 | Zhou et al. | 455/454 |
| 2002/0154653 A1 | 10/2002 | Benveniste | |
| 2003/0103521 A1 * | 6/2003 | Raphaeli et al. | 370/445 |
| 2008/0069275 A1 | 3/2008 | Horiguchi et al. | |
| 2009/0061780 A1 | 3/2009 | Sekiya et al. | |
| 2009/0213815 A1 * | 8/2009 | Sherman et al. | 370/448 |

FOREIGN PATENT DOCUMENTS

| | | |
|---|---|---|
| JP | 6-164444 | 6/1994 |
| JP | 8-19030 | 1/1996 |
| JP | 2007-134905 | 5/2007 |
| WO | WO 2006/098688 A1 | 9/2006 |

OTHER PUBLICATIONS

Japanese Office Action issued Jun. 19, 2012 in Patent Application No. 2008-191020.

\* cited by examiner

*Primary Examiner* — Ricky Ngo
*Assistant Examiner* — Phuongchau B Nguyen
(74) *Attorney, Agent, or Firm* — Oblon, Spivak, McClelland, Maier & Neustadt, L.L.P.

(57) ABSTRACT

A communication device of an example of the present invention comprises a first unit determining that whether a state is a first state indicating that a transmission medium is in use, a second state indicating that the transmission medium is not in use, or a third state indicating that whether or not the transmission medium is in use is being determined, and a second unit prohibiting a data transmission in the first and third states, and permitting the data transmission in the second state.

3 Claims, 2 Drawing Sheets

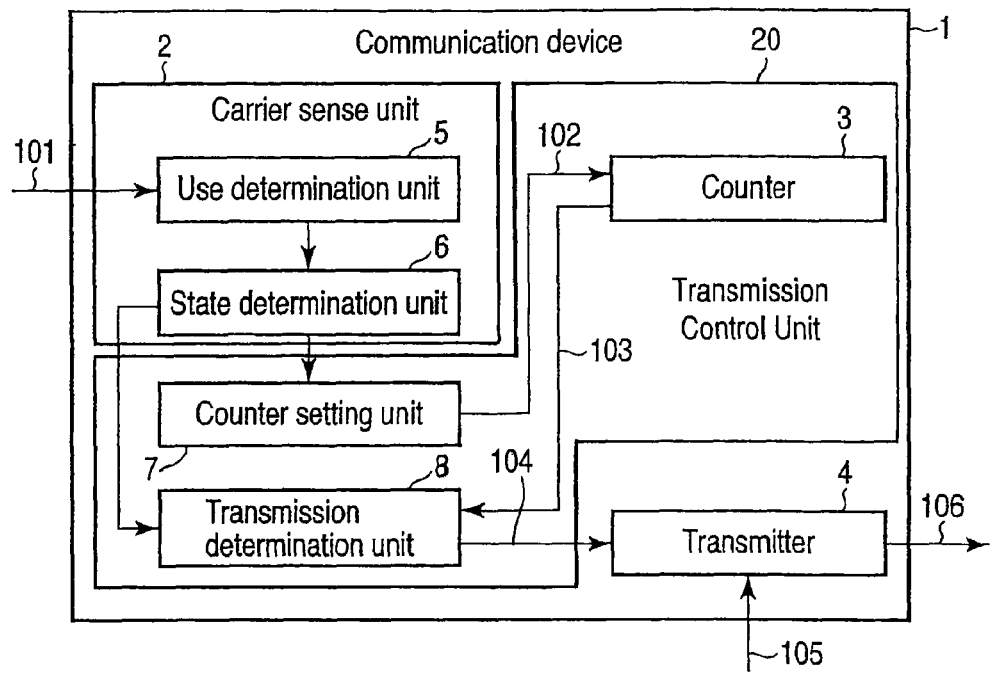
F I G. 1
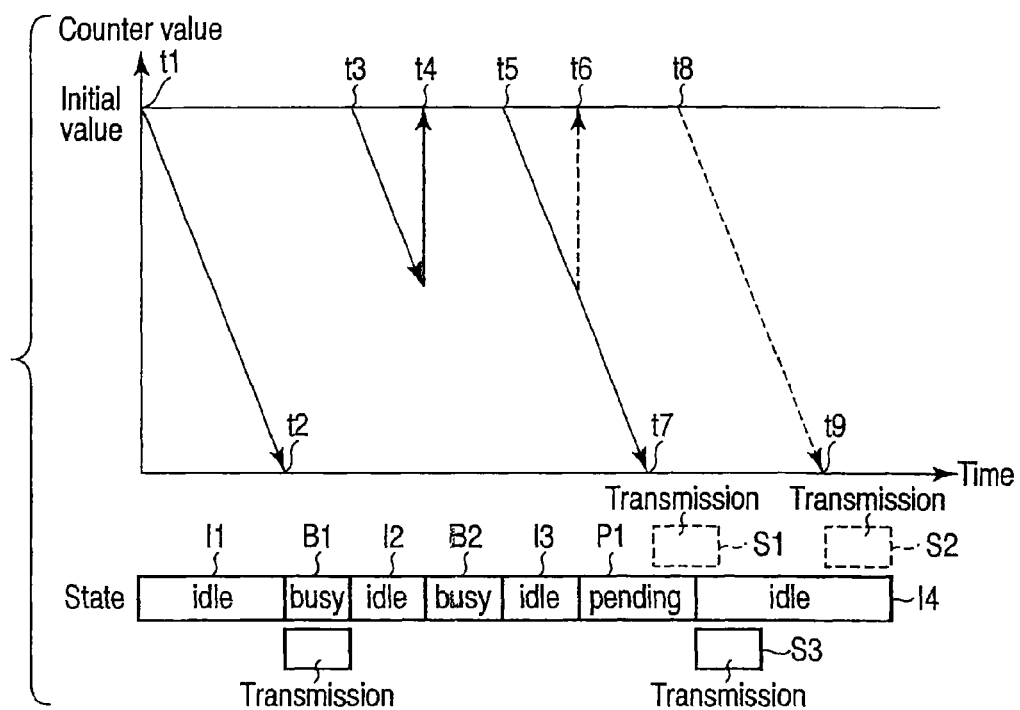
F I G. 2

COMMUNICATION DEVICE COMPRISING A CARRIER SENSE FUNCTION AND COMMUNICATION METHOD

CROSS-REFERENCE TO RELATED APPLICATIONS

This application is a division of claims the benefit of priority under 35 U.S.C. §120 from U.S. Ser. No. 12/508,099 filed Jul. 23, 2009, and claims the benefit of priority under 35 U.S.C. §119 from Japanese Patent Application No. 2008-191020 filed Jul. 24, 2008, the entire contents of each of which are incorporated herein by reference.

BACKGROUND OF THE INVENTION

1. Field of the Invention

The present invention relates to a communication device comprising a carrier sense function and a communication method.

2. Description of the Related Art

A wireless LAN communication conforming to the IEEE 802.11 standards (for example, IEEE 802.11a/b/g/n) executes a random access based on carrier sense multiple access/with collision avoidance (CSMA/CA). For this reason, the arrival time of a received frame is unknown, and basically, a terminal always executes a frame detection operation.

According to the wireless LAN communication, it is difficult to fully avoid a frame error detection (i.e., a frame does not arrive; nevertheless, the frame arrival is detected) due to an influence of a thermal noise of the self-station, or an electric noise of a peripheral apparatus.

According to the IEEE 802.11 standards, when a frame is detected, it is determined that a carrier exists, and transmission is prohibited and the value of a counter waiting a transmission opportunity is cleared. For this reason, the frame error detection is a major factor in losing a transmission opportunity.

For example, Reference 1 (Jpn. Pat. Appln. KOKAI Publication No. 08-019030) discloses a technique of performing accurate carrier sense without receiving an influence of a noise generated by the device itself before wireless transmission starts.

According to the technique disclosed in the Reference 1, when a communication is executed, a control circuit operates a timer circuit for fixed time and the control circuit itself is changed in a suspended state. When a time out is occurred by the timer circuit, an interruption is executed for the control circuit, and the control circuit restarts. The control circuit executes a carrier sense using a wireless controller after it restarts. The Reference 1 discloses a technique that a determination of clear channel assessment (CCA) is not executed in the transmission timing because of a determination mistake being determined that a carrier exists though the carrier does not exist is often occurred in the transmission timing.

In contrast, Reference 2 (Jpn. Pat. Appln. KOKAI Publication No. 06-164444) discloses a technique that a CCA determination is not executed in the built-in DRAM refresh timing because of a determination mistake being determined that a carrier exists though the carrier does not exist is often occurred in the built-in DRAM refresh timing.

However, according to the Reference 1 and 2, it is difficult to avoid an error detection basis of a thermal noise and an unwanted radiation electric wave except the self-station.

BRIEF SUMMARY OF THE INVENTION

According to first aspect of the invention, there is provided a communication device comprising:

a first unit determining that whether a state is a first state indicating that a transmission medium is in use, a second state indicating that the transmission medium is not in use, or a third state indicating that whether or not the transmission medium is in use is being determined; and a second unit prohibiting a data transmission in the first and third states, and permitting the data transmission in the second state.

According to second aspect of the invention, there is provided a communication device comprising:

a receiving signal strength measuring unit measuring a strength of a received signal;

a threshold determination unit determining whether or not the strength of the received signal is equal to or more than a predetermined threshold value;

a receiving trigger unit issuing a data receiving start signal based on the received signal;

a preamble detector unit determining whether or not a header of the received signal has a predetermined waveform after the data receiving start signal is issued;

a receiving unit starting to receive the received signal after the data receiving start signal is issued, and issuing a data receiving end signal after a data receiving of the received signal ends, a first carrier sense unit setting a first state indicating that a transmission medium is in use when it is determined that the transmission medium is in use for the data receiving based on the data receiving start signal and the data receiving end signal, and executing a transferring to a second state indicating that the transmission medium is not in use when the threshold determination unit determines that the strength of the received signal is not equal to or more than the predetermined threshold value in the first state;

a second carrier sense unit executing a transferring to the first state when the threshold determination unit determines that the strength of the received signal is equal to or more than the predetermined threshold value in the second state, and executing a transferring to a third state indicating that whether or not the transmission medium is in use is being determined when the receiving trigger unit issues the data receiving start signal in the second state;

a third carrier sense unit executing a transferring to the first state when the preamble detector unit determines that the header of the received signal has the predetermined waveform in the third state, executing a transferring to the second state when the preamble detector unit determines that the header of the received signal does not have the predetermined waveform in the third state, and executing a transferring to the first state when the threshold determination unit determines that the strength of the received signal is equal to or more than the predetermined threshold value in the third state; and a transmission unit transmitting data in the second state.

According to third aspect of the invention, there is provided a method comprising:

determining that whether a state is a first state indicating that a transmission medium is in use, a second state indicating that the transmission medium is not in use, or a third state indicating that whether or not the transmission medium is in use is being determined; and prohibiting a data transmission in the first and third states, and permitting the data transmission in the second state.

BRIEF DESCRIPTION OF THE SEVERAL VIEWS OF THE DRAWING

FIG. 1 is a block diagram indicating an example of the configuration of a communication device according to a first embodiment of the present invention.

FIG. 2 is a view to explain an example of the relationship between a count value of a counter, a busy state, an idle state and a pending state.

DETAILED DESCRIPTION OF THE INVENTION

Figure 3:
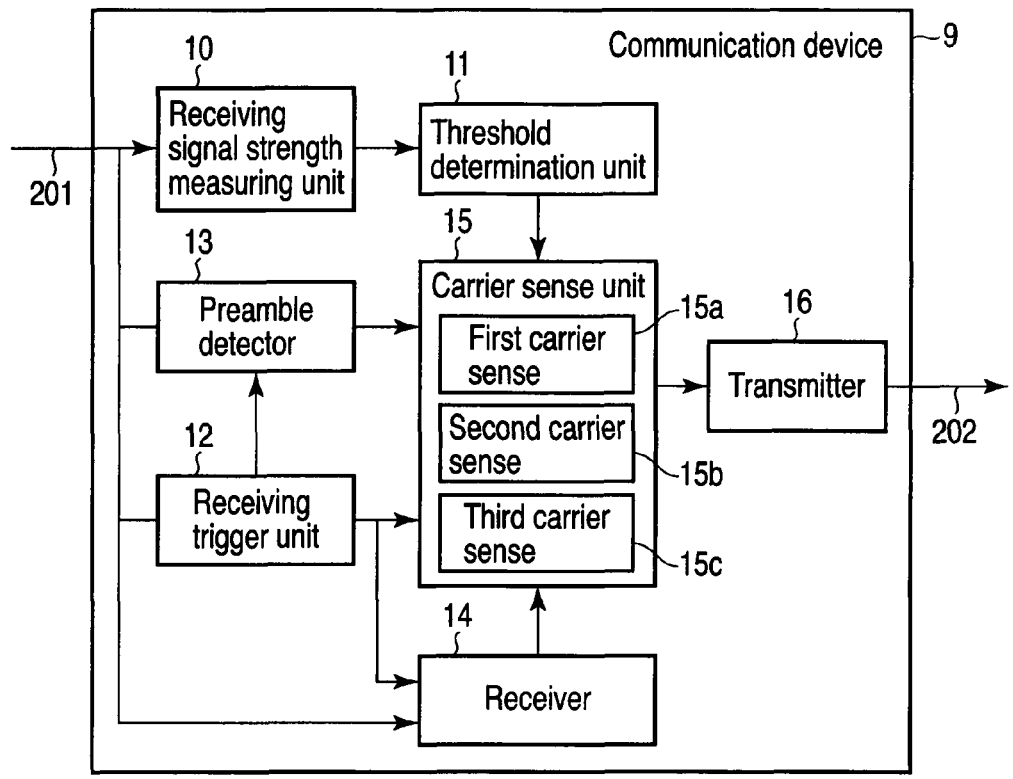
FIG. 3 is a block diagram indicating an example of the configuration of a communication device according to a second embodiment of the present invention.

Various embodiments of the present invention will be hereinafter described with reference to the accompanying drawings. In the following drawings, the same numerals are used to designate identical portions, and the explanation is omitted.

First Embodiment

This first embodiment relates to a communication device comprising a carrier sense function. In the following description, system on a chip (SoC) employed for the IEEE 802.11 standards will be mainly explained. A similar technique as above is applicable to all of communication devices executing a carrier sense.

This embodiment is a technique related to clear channel assessment (CCA) of wireless LAN communications (IEEE 802.11a/b/g/n, etc.). According to this embodiment, a busy state (first state), an idle state (second state) and a pending state (third state), that is, a three-value CCA is employed. Immediately after a received signal is detected, a state transfers to the pending state, when it is confirmed that a detection for the received signal is not an error detection and the received signal is a signal of wireless LAN communication, the state transfers to the busy state. In the pending state, a frame transmission is stopped, but a value of a counter used for counting in an interval of a continuous idle state is not cleared. In this way, it is possible to prevent a loss of a transmission opportunity due to frame error detection such that a frame does not arrive; nevertheless, a frame arrival is detected.

FIG. 1 is a block diagram indicating an example of the configuration of a communication device according to a first embodiment of the present invention.

A communication device 1 determines whether or not a transmission medium of a wireless LAN communication is in use (i.e., a received signal is being received and a transmission signal is being transmitted). Further, the communication device 1 includes a carrier sense unit 2, a transmission control unit 20 and a transmitter 4. The carrier sense unit 2 determines any of a busy state, a pending state and an idle state based on a result that whether or not the transmission medium is in use is determined.

The carrier sense unit 2 includes a use determination unit 5 and a state determination unit 6. The transmission control unit 20 includes a counter 3, a counter setting unit 7 and a transmission determination unit 8.

The counter 3 is used from counting a time that the transmission medium is not in use continuously (i.e., a free time of the transmission medium).

The use determination unit 5 determines whether or not the transmission medium is in use based on a received signal 101.

The state determination unit 6 determines whether a state is the busy state indicating that the transmission medium is in use, an idle state indicating that the transmission medium is not in use (the transmission medium is free), and a pending state indicating that the communication device 1 is on determination whether or not a transmission medium is in use and temporarily pending based on a determined result by the use determination unit 5.

The counter setting unit 7 sets an initial value (predetermined value) for the counter 3 when the communication device 1 is in an initial state and when the state determination unit 6 determines that the state is the busy state. A timing of setting the initial value for the counter 3 may be taken anytime between the other state transfers to the busy state and the busy state transfers to another state.

The counter setting unit 7 outputs a count instruction signal 102 to the counter 3 when the state determination unit 6 determines that the state transfers from the busy state to the idle state. Hereby, an operation of incrementing (count up) or decrementing (count down) of the counter 3 is started.

The counter setting unit 7 maintains the operation of incrementing or decrementing of the counter 3 when the state determination unit 6 determines that the state transfers from the idle state to the pending state.

The transmission determination unit 8 inputs a count value 103 which is outputted from the counter 3, and then, determines that a data transmission is possible when the state determination unit 6 determines that the state is the idle state and when the count value 103 of the counter 3 is "equal to or more than" or "equal to or less than" a predetermined threshold. Further, the transmission determination unit 8 outputs a transmission enabling signal 104 to the transmitter 4 when it is determined that the data transmission is possible. The transmission determination unit 8 prohibits the data transmission when the state determination unit 6 determines that the state is the busy state and the pending state and when the state is the idle state and the count value 103 of the counter 3 is not "equal to or more than" or "equal to or less than" the predetermined threshold.

When inputting a transmission request signal 105 and the transmission enable signal 104 indicating that the transmission determination unit 8 determines that the data transmission is possible, the transmitter 4 outputs a transmission signal 106 and carries out the data transmission.

FIG. 2 is a view to explain an example of the relationship between the count value of the counter 3, the busy state, the idle state and the pending state.

The counter setting unit 7 of the transmission control unit 20 sets the counter 3 so that the counter 3 has the initial value in the initial state, after a frame is received (any time until a frame receiving end from a frame receiving start) and after a frame is transmitted (any time until a frame transmission end from a frame transmission start) (t1).

The count value of the counter 3 is decremented in the idle state. The transmission determination unit 8 of the transmission control unit 20 determines that the data transmission is possible when the count value of the counter 3 becomes zero in an idle state I1 (t2). When the transmission determination unit 8 determines that the data transmission is possible, the transmitter 4 transmits a transmission frame if the transmission frame is prepared. Then, the state determination unit 6 of the carrier sense unit 2 transfers the state from the idle state to a busy state B1.

In this case, the count value of the counter 3 is decremented. However, the count value of the counter 3 may be incremented. Specifically, when the count value reaches the predetermined value which is greater than the initial value in the idle state, the transmission determination unit 8 determines that the transmission frame is transmittable. The transmission determination unit 8 of the transmission control unit 20 determines that the transmission is possible when the count value of the counter 3 becomes zero in the idle state. In this case, the transmission determination unit 8 determines that the transmission is possible when the count value of the counter 3 becomes another predetermined value which is less than the initial value in the idle state.

When the frame transmission ends (t3), the state determination unit 6 of the carrier sense unit 2 transfers the state from the busy state B1 to an idle state I2. Further, the counter setting unit 7 of the transmission control unit 20 sets the initial value in the counter 3 so that the counter 3 starts decrementing of the count value.

At a certain time (t4), when the state determination unit 6 of the carrier sense unit 2 transfers the state from the idle state I2 to a busy state B2 indicating that the transmission medium is in use, the counter setting unit 7 of the transmission control unit 20 thereof sets the initial value in the counter 3.

When the state determination unit 6 of the carrier sense unit 2 transfers the state from the busy state B2 to an idle state I3 (t5), the counter 3 starts decrementing of the count value.

At a certain time (t6) of the FIG. 2, processing determining whether the transmission medium is in use or free is occurred because of a trigger condition is satisfied. For example, when the strength of a radio wave becomes equal to or more than the predetermined threshold or the radio wave of a predetermined waveform is detected, it is determined that the trigger condition is satisfied.

According to the conventional carrier sense function, the pending state of this embodiment is not applied. In the conventional carrier sense function, when determination processing which determined that whether or not the transmission medium is in use is occurred, "the idle state I3 is maintained and the decrementing of the count value of the counter is maintained" or "the state transfers from the idle state I3 to the busy state and the initial value is set in the counter" is carried out. When the idle state I3 is maintained and the decrementing of count value of the counter is maintained, a frame transmission S1 is possible at the time (t7) the count becomes zero. However, there is a problem that a collision occurs when the transmission medium is being used in a determination result. When the state transfers from the idle state I3 to the busy state and the initial value is set in the counter, the decrementing of the count value of the counter is started from the time (t8) the state transfers from the busy state to the idle state. The transmission is stopped during the decrementing, and then, transmission S2 of a transmission frame is possible at the time (t9) the count value becomes zero. In this case, the transmission of the transmission frame is delayed.

In contrast, according to this embodiment, the state determination unit 6 of the carrier sense unit 2 transfers the state from the idle state I3 to a pending state P1 at a time that "determination processing which determines whether a transmission medium is in use or free" occurs.

In the pending state P1, the counter 3 continues decrementing because the state is not in the busy state indicating that the transmission medium is being used. Conversely, the transmission determination unit 8 of the transmission control unit 20 prohibits the frame transmission because of a possibility of using the transmission medium in the pending state P1 is relatively higher than the case of the idle state.

According to this embodiment, when the transmission determination unit 8 of the transmission control unit 20 determines that the state is the pending state P1, even if the count value of the counter 3 becomes zero (t7), the transmission determination unit 8 of the transmission control unit 20 does not permit a transmission immediately. In this way, it is possible to prevent an occurrence of transmission collision.

The use determination unit 5 of the carrier sense unit 2 determines whether the transmission medium is in use or free. As a result, when it is determined that the transmission medium is free, the state determination unit 6 of the carrier sense unit 2 transfers the state from the pending state P1 to an idle state I4. If the state is the idle state I4 and the count value is zero, the state determination unit 6 of the carrier sense unit 2 permits a frame transmission S3. Therefore, the transmission frame is transmittable earlier than the case of not handling the pending state.

According to the foregoing embodiment, a data transmission collision is avoided, and further, a transmission opportunity is earlier obtained. Therefore, the communication device of this embodiment is especially effective in the use under the condition that the determination processing that whether a transmission medium is in use or free frequently occurs.

Second Embodiment

The second embodiment explains the configuration of a communication device, which performs a state transition for any of a busy state, a pending state and an idle sate based on a received signal.

FIG. 3 is a block diagram indicating an example of the configuration of a communication device according to a second embodiment.

A communication device 9 includes a receiving signal strength measuring unit 10, a threshold determination unit 11, a receiving trigger unit 12, a preamble detector 13, a receiver 14, a carrier sense unit 15 and a transmitter 16.

The receiving signal strength measuring unit 10 inputs a received signal 201, measures a received signal strength, and then, outputs a measured result to the threshold determination unit 11.

The threshold determination unit 11 compares a predetermined threshold with the measured result supplied from the received signal strength measuring unit 10, and then, outputs a comparison result to the carrier sense unit 15.

The received trigger unit 12 issues a frame receiving start signal based on the received signal 201 to output the frame receiving start signal to the carrier sense unit 15 and the receiver 14. More specifically, for example, when a significant rise of a received signal power is detected, a predetermined cycle in the received signal is detected, or a correspondence of the received signal and a predetermined waveform is detected, the receiving trigger unit 12 issues a frame receiving start signal. In addition, a signal header detection processing disclosed in Jpn. Pat. Appln. KOKAI Publication No. 2004-104499 may be used. Moreover, for example, the receiving trigger unit 12 issues the frame receiving start signal based on a signal received in the past at time a received frame arrival is expected.

The receiver 14 demodulates and decodes the received signal after the frame receiving start signal is inputted. After a frame receiving is completed, the receiver 14 outputs a frame receiving end signal to the carrier sense unit 15.

The preamble detector 13 analyzes the received signal 201 when inputting a frame receiving start signal from the receiving trigger unit 12. Specifically, the preamble detector 13 determines whether a header of the received signal 201 has a predetermined waveform, and then, outputs a determined result to the carrier sense unit 15.

The carrier sense unit 15 inputs each signal from the threshold determination unit 11, receiving trigger unit 12, preamble detector 13 and receiver 14, and determines whether or not transmission is possible according to a predetermined rule such as the IEEE 802.11 standard.

The transmitter 16 transmits a transmission frame when the transmission frame is prepared and the carrier sense unit 15 determines that the transmission is possible.

Figure 4:
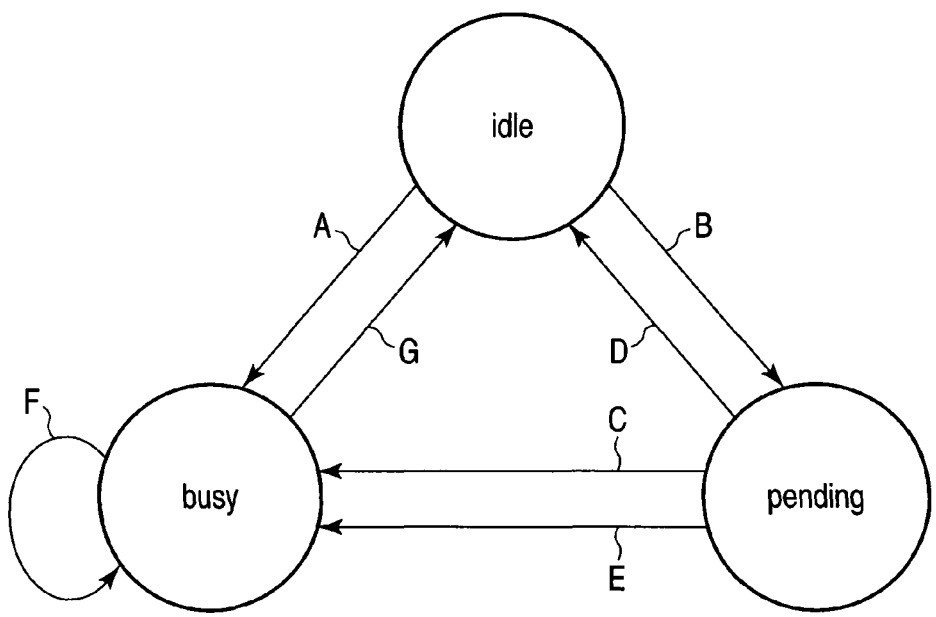
FIG. 4 is a view to explain an example of a state transition of a carrier sense unit according to the second embodiment.

FIG. 4 is a view to explain an example of a state transition of the carrier sense unit 15 according to this embodiment.

As described above, the busy state is a state indicating that the transmission medium is in use. The pending state is a state indicating that whether or not the transmission is in use is being determined. The idle state is a state indicating that the transmission medium is free.

A transition from the idle state to other states will be described below.

A second carrier sense unit 15b of the carrier sense unit 15 transfers the state from the idle state to the busy state when (A) the outputted signal from the threshold determination unit 11 indicating that the received signal strength is equal to or more than the predetermined threshold in the idle state.

The second carrier sense unit 15b of the carrier sense unit 15 transfers the state from the idle state to the pending state when (B) the receiving trigger unit 12 issues the frame receiving start signal (frame receiving start) in the idle state.

When (A) the received signal strength is equal to or more than the predetermined threshold and (B) the receiving trigger unit 12 issues the frame receiving start signal in the idle state, the second carrier sense unit 15b of the carrier sense unit 15 transfers the state from the idle state to the busy state to preferentially select the (A).

A transition from the pending state to other states will be described below.

A third carrier sense unit 15c of the carrier sense unit 15 transfers the state from the pending to the busy state in the case of (C) that the third carrier sense unit 15c inputs a signal indicating that the header of the received signal from the preamble detector 13 has the predetermined waveform (the header is preamble) in the pending state.

The third carrier sense unit 15c of the carrier sense unit 15 transfers the state from the pending state to the busy state in the case of (D) that the third carrier sense unit 15c inputs a signal indicating that the header of the received signal from the preamble detector 13 does not have the predetermined waveform (the header is not preamble) in the pending state.

The third carrier sense unit 15c of the carrier sense unit 15 transfers the state from the pending state to the busy state in the case of (E) that the threshold determination unit 11 determines that the received signal strength is equal to or more than the predetermined threshold in the third state.

When (E) the received signal strength is equal to or more than the predetermined threshold and (D) the second carrier sense unit 15b inputs a signal indicating that the header of the received signal from the preamble detector 13 does not have the predetermined waveform (the header is not preamble) in the pending state, the third carrier sense unit 15c of the carrier sense unit 15 transfers the state from the pending state to the busy state to preferentially select the (E).

A transition from the busy state to other states will be described below.

A first carrier sense unit 15a of the carrier sense unit 15 stays in the busy state in the case of (F) that a frame is being received in the busy state. For example, the carrier sense unit 15 determines whether or not the frame is in receiving (the frame is being received) based on the frame receiving start signal being issued by the receiving trigger unit and the frame receiving end signal being issued by the receiver.

The first carrier sense unit 15a of the carrier sense unit 15 transfers the state from the busy state to the idle state when (G) the outputted signal from the threshold determination unit 11 indicating that the received signal strength is not equal to or more than the predetermined threshold in the busy state.

When (F) the frame is being received and (G) the received signal strength is not equal to or more than the predetermined threshold in the busy state, the first carrier sense unit 15a of the carrier sense unit 15 stays in the busy state to preferentially select the (F).

A transition condition transferring from the busy state to the pending state may be added in this embodiment.

As described above, state transitions of the carrier sense unit 15 is controlled, and thereby, the following advantage is obtained. Specifically, if the receiving trigger unit 12 issues the frame receiving start signal in error, that is, actually, even if a frame does not arrive; nevertheless, the frame receiving start signal is issued, the state does not transfer to the busy state. Therefore, this serves to reduce a loss of a transmission opportunity.

The foregoing functions of the communication devices according to the embodiments can be realized by both of software and hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication device comprising:
   a receiving signal strength measuring unit measuring a strength of a received signal;
   a threshold determination unit determining whether or not the strength of the received signal is equal to or more than a predetermined threshold value;
   a receiving trigger unit issuing a data receiving start signal based on the received signal;
   a preamble detector unit determining whether or not a header of the received signal has a predetermined waveform after the data receiving start signal is issued;
   a receiving unit starting to receive the received signal after the data receiving start signal is issued, and issuing a data receiving end signal after a data receiving of the received signal ends,
   a first carrier sense unit setting a first state indicating that a transmission medium is in use when it is determined that the transmission medium is in use for the data receiving based on the data receiving start signal and the data receiving end signal, and executing a transferring to a second state indicating that the transmission medium is not in use when the threshold determination unit determines that the strength of the received signal is not equal to or more than the predetermined threshold value in the first state;
   a second carrier sense unit executing a transferring to the first state when the threshold determination unit determines that the strength of the received signal is equal to or more than the predetermined threshold value in the second state, and executing a transferring to a third state indicating that whether or not the transmission medium is in use is being determined when the receiving trigger unit issues the data receiving start signal in the second state;

a third carrier sense unit executing a transferring to the first state when the preamble detector unit determines that the header of the received signal has the predetermined waveform in the third state, executing a transferring to the second state when the preamble detector unit determines that the header of the received signal does not have the predetermined waveform in the third state, and executing a transferring to the first state when the threshold determination unit determines that the strength of the received signal is equal to or more than the predetermined threshold value in the third state; and a transmission unit transmitting data in the second state.

2. The device according to claim 1, conforming to an IEEE 802.11 standard.

3. The device according to claim 1, wherein when the signal is being received and the threshold determination unit determines that the strength of the received signal is less than the predetermined threshold value in the first state, the first carrier sense unit maintains the first state to preferentially select a transformation condition that the signal is being received, when the strength of the received signal is equal to or more than the predetermined threshold value and the receiving trigger unit issues the data receiving start signal in the second state, the second carrier unit executes a transferring to the first state to preferentially select a transformation condition that the strength of the received signal is equal to or more than the predetermined threshold value, and when the strength of the received signal is equal to or more than the predetermined threshold value and the preamble detector unit determines that the header of the received signal does not have the predetermined waveform in the third state, the third carrier sense unit executes a transferring to the first state to preferentially select a transformation condition that the strength of the received signal is equal to or more than the predetermined threshold value.

* * * * *